United States Patent
Mundt et al.

(10) Patent No.: US 11,989,147 B2
(45) Date of Patent: May 21, 2024

(54) LCS NETWORKING DEVICE MULTI-HOST PRIMARY CIRCUIT BOARD SYSTEM

(71) Applicant: Dell Products L.P., Round Rock, TX (US)

(72) Inventors: Kevin Warren Mundt, Austin, TX (US); Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 17/834,619

(22) Filed: Jun. 7, 2022

(65) Prior Publication Data

US 2023/0394001 A1 Dec. 7, 2023

(51) Int. Cl.
 *G06F 13/40* (2006.01)
 *G06F 13/28* (2006.01)
 *G06F 13/38* (2006.01)

(52) U.S. Cl.
 CPC .......... *G06F 13/4022* (2013.01); *G06F 13/28* (2013.01); *G06F 13/385* (2013.01); *G06F 13/4068* (2013.01); *G06F 2213/0026* (2013.01); *G06F 2213/3808* (2013.01)

(58) Field of Classification Search
 CPC . G06F 13/4022; G06F 13/4068; G06F 13/385
 See application file for complete search history.

(56) References Cited

U.S. PATENT DOCUMENTS

| | | | |
|---|---|---|---|
| 8,996,781 B2 | 3/2015 | Schuette et al. | |
| 2022/0043475 A1* | 2/2022 | Iyengar | H03K 19/1737 |
| 2023/0205718 A1* | 6/2023 | Guim Bernat | G06F 9/5083 |
| | | | 710/316 |

* cited by examiner

*Primary Examiner* — David E Martinez
(74) *Attorney, Agent, or Firm* — Joseph Mencher

(57) ABSTRACT

An LCS networking device multi-host primary circuit board system includes a primary circuit board having a host processing system that provides an operating system for an LCS. A networking device connector on the circuit board is configured to connect to a networking device that performs networking operation(s) for the LCS, with the networking device connector also coupled via the circuit board to the host processing system to provide a first host coupling that is used by the networking device to access the host processing system. A first orchestrator device connector on the circuit board is configured to cable to an orchestrator device including an orchestrator processing system that performs orchestration operations for the LCS, with the first orchestrator device connector also coupled via the circuit board to the networking device connector to provide a second host coupling that is used by the networking device to access the orchestrator processing system.

20 Claims, 10 Drawing Sheets

LCS NETWORKING DEVICE MULTI-HOST PRIMARY CIRCUIT BOARD SYSTEM

BACKGROUND

The present disclosure relates generally to information handling systems, and more particularly to a primary circuit board for coupling a networking device to multiple hosts in a Logically Composed System (LCS) provided by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system, with a processing system and memory system that are included on a primary circuit board (e.g., a motherboard) in the BMS system used to provide an Operating System (OS) for the LCS. One technique for providing such an LCS may include the use of an orchestrator device in the BMS system that operates to compose the LCS, as well as provide resource devices and their functionality to the OS in order to enable the performance of a variety of operations by the LCS. In some situations, it may be desirable to provide an additional networking device for the LCS (i.e., in addition to the orchestrator device, which one of skill in the art in possession of the present disclosure will appreciated may perform networking functionality as well). For example, such additional networking devices may be provided in the LCS in order to provide additional networking bandwidth for the LCS, perform functionality that the orchestrator device is not configured to perform (e.g., Remote Direct Memory Access (RDMA) functionality), provide a data path that bypasses the orchestrator device, and/or for other expansion functionality that would be apparent to one of skill in the art in possession of the present disclosure. However, one of skill in the art in possession of the present disclosure will appreciate that LCSs include two hosts: a first host provided by a host processor (e.g., a x86 processor) included on the motherboard of the BMS system, and a second host provided by an orchestrator processor included on the orchestrator device, which can raise some issues.

For example, networking devices provided according to the Open Compute Project (OCP) NIC 3.0 specification (the "OCP NIC 3.0 networking device" below) are configured to couple to an LCSs via its motherboard using a connector that is hardwired (e.g., via motherboard traces) to the host processor, and thus there is no capability to directly connect that OCP NIC 3.0 networking device to the orchestrator processor on the orchestrator device. As such, while OCP NIC 3.0 networking devices are configured to utilize multiple hosts (e.g., for utilization with a pair of Central Processing Units (CPUs) on a motherboard in a Non-Uniform Memory Access (NUMA) configuration), the inability to connect them to the multiple hosts in the LCS prevents, for example, the provisioning of their functionality to either or both the first host/host processor and the second host/orchestrator processor in the LCS.

Accordingly, it would be desirable to provide an LCS networking device multi-host primary circuit board system that addresses the issues discussed above.

SUMMARY

According to one embodiment, an Information Handling System (IHS) includes a networking device that performs at least one networking operation for a Logically Composed System (LCS); an orchestrator device including an orchestrator processing system that performs orchestration operations for the LCS; a primary circuit board including a host processing system that provides an operating system for the LCS, wherein the primary circuit board includes: a networking device connector that is configured to connect to the networking device and that is also coupled via the primary circuit board to the host processing system to provide a first host coupling that is configured for use by the networking device to access the host processing system; and a first orchestrator device connector that is configured to cable to the orchestrator device and that is also coupled via the primary circuit board to the networking device connector to provide a second host coupling that is configured for use by the networking device to access the orchestrator processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
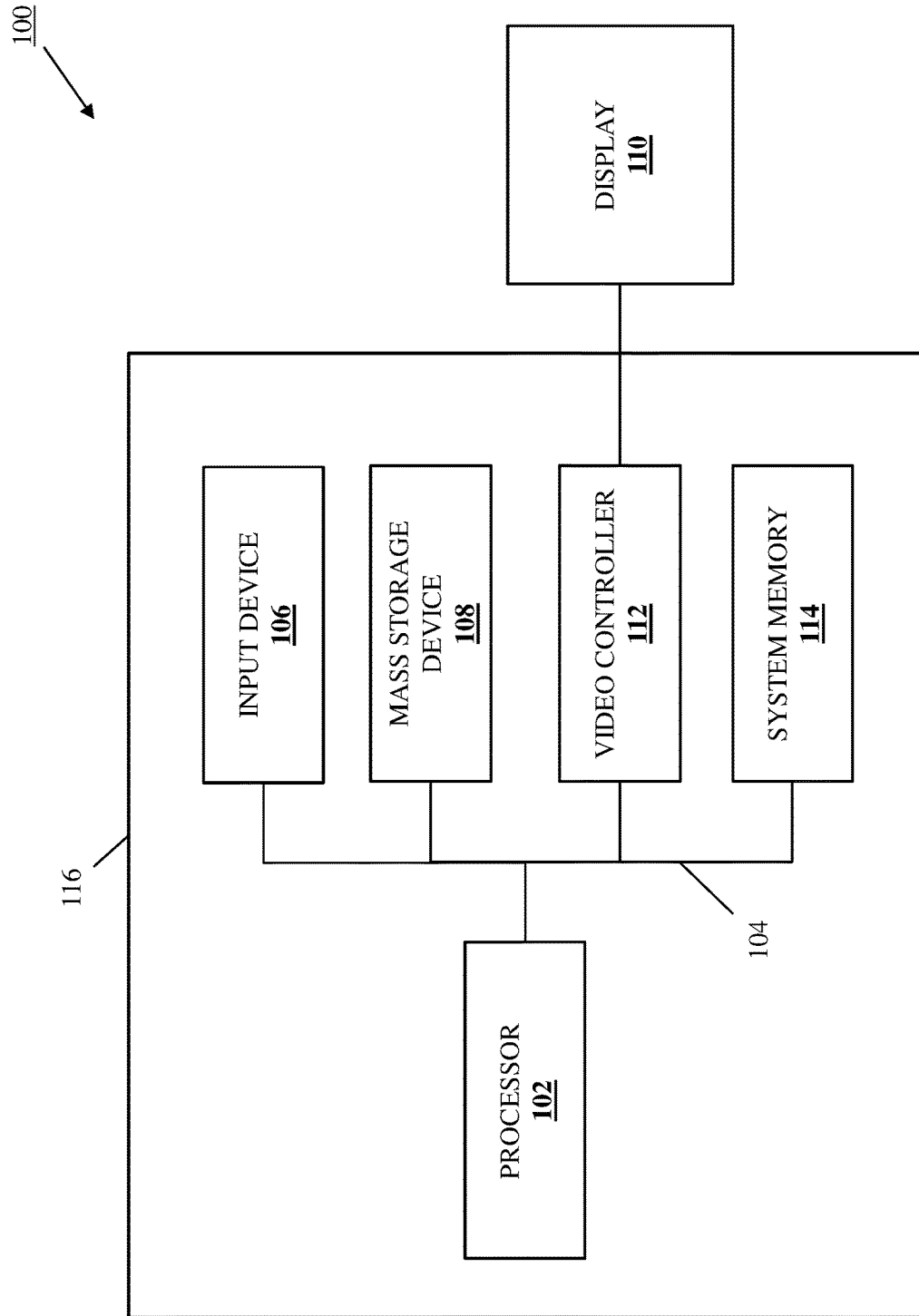
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) networking device multi-host primary circuit board systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
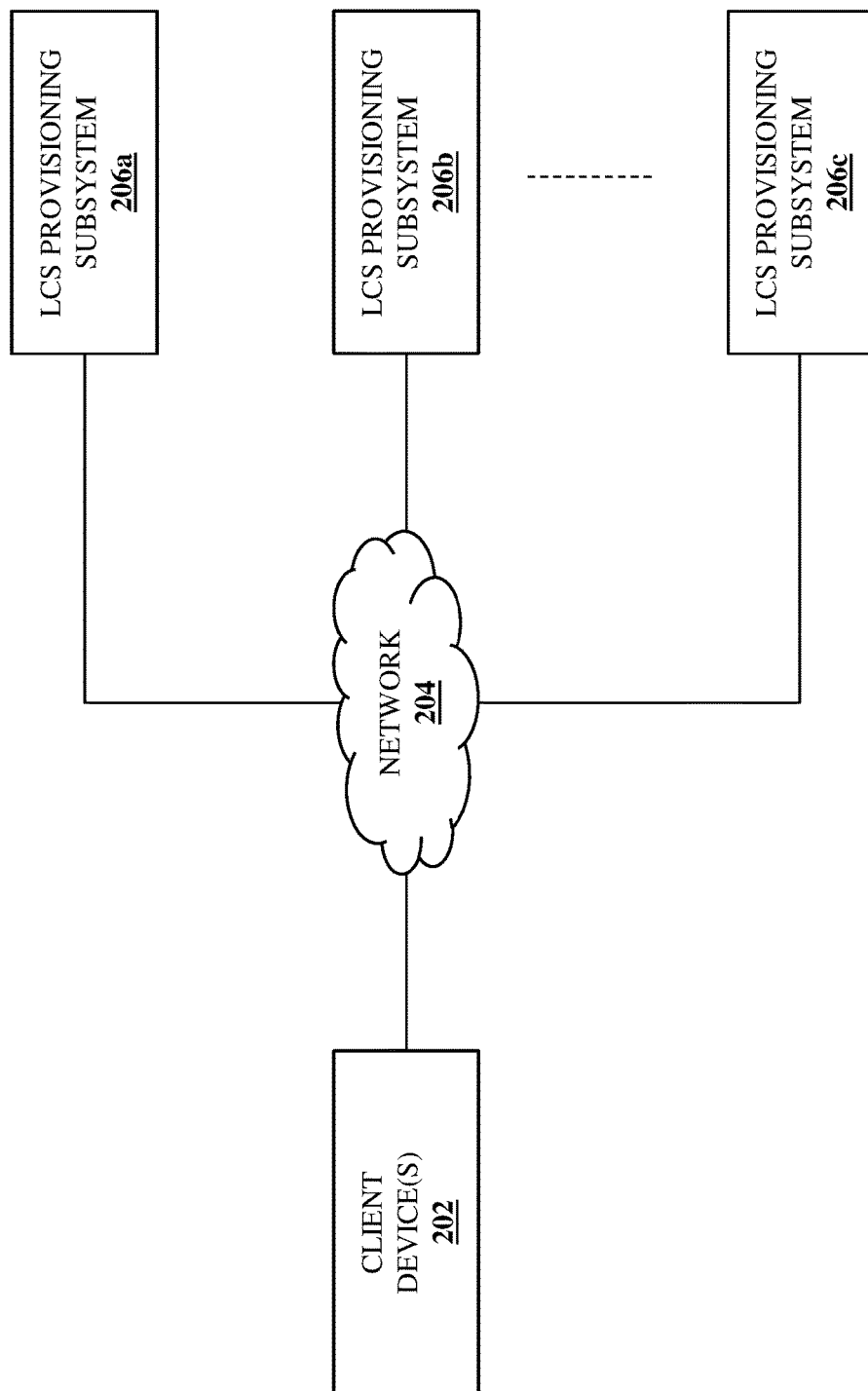
FIG. 2 is a schematic view illustrating an embodiment of an LCS provisioning system.

With reference to FIG. 2, an embodiment of a Logically Composed System (LCS) provisioning system 200 is illustrated that may be utilized with the LCS networking device multi-host primary circuit board systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
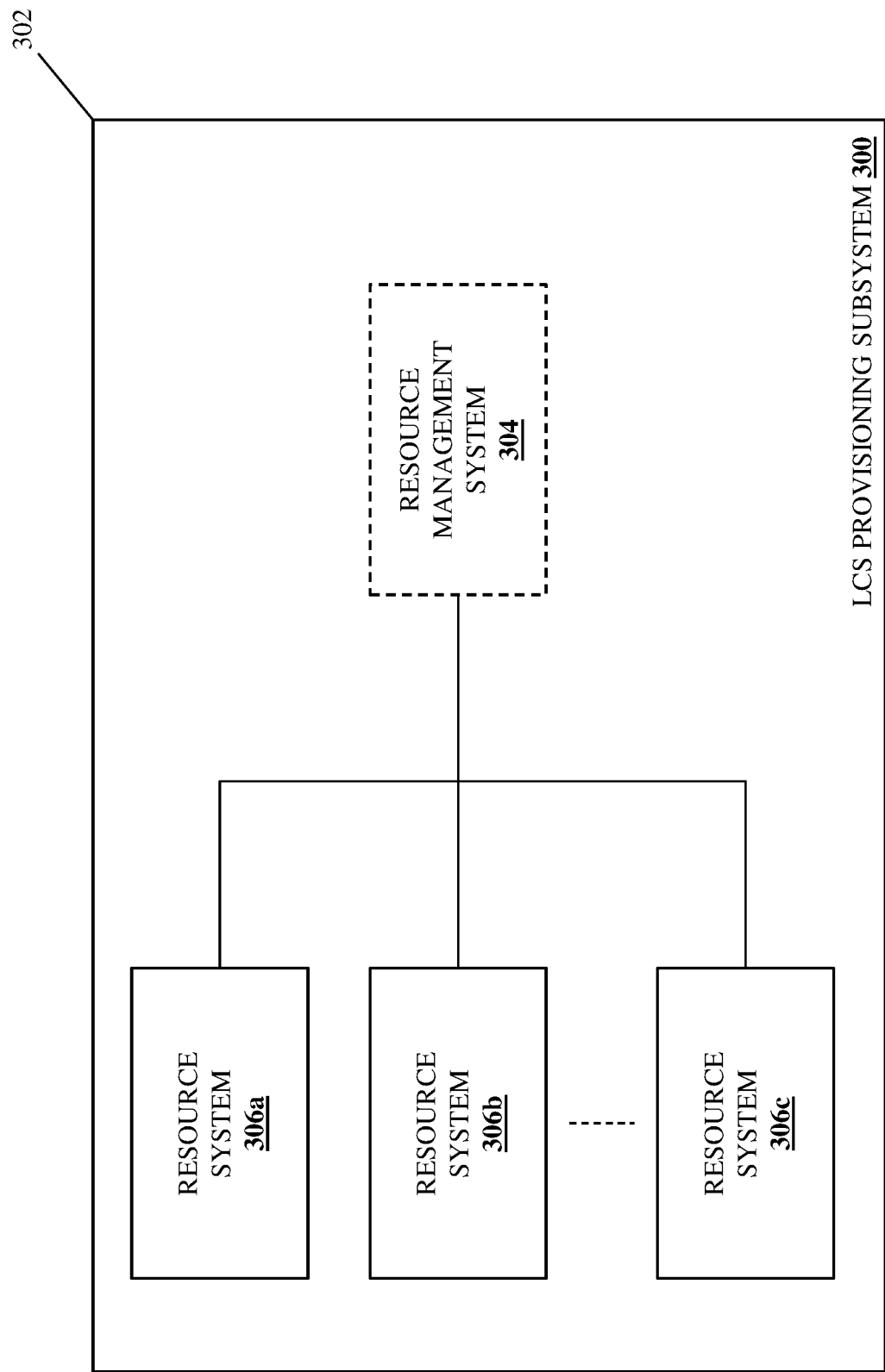
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, which may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
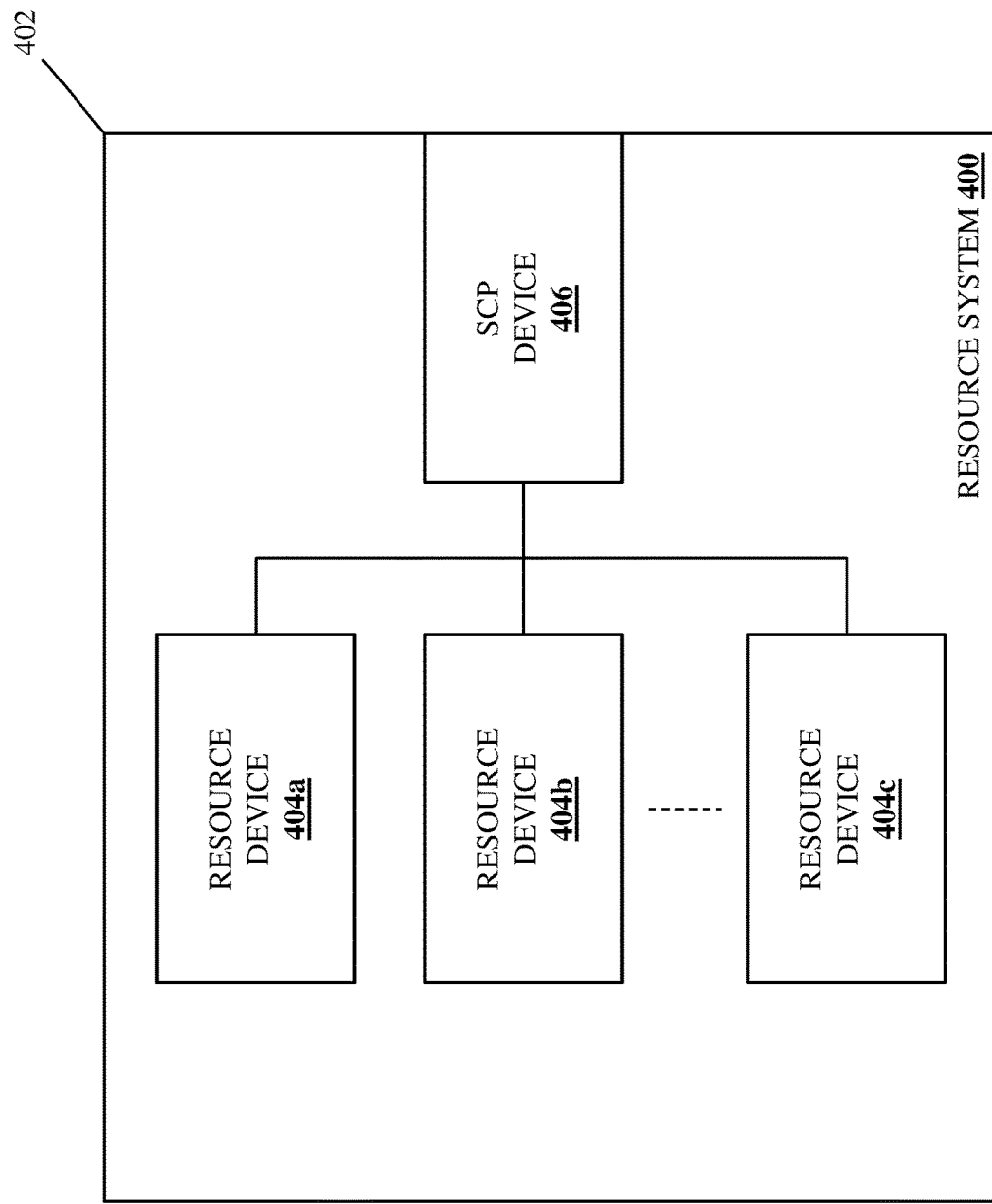
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. In one example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. Thus, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource source system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
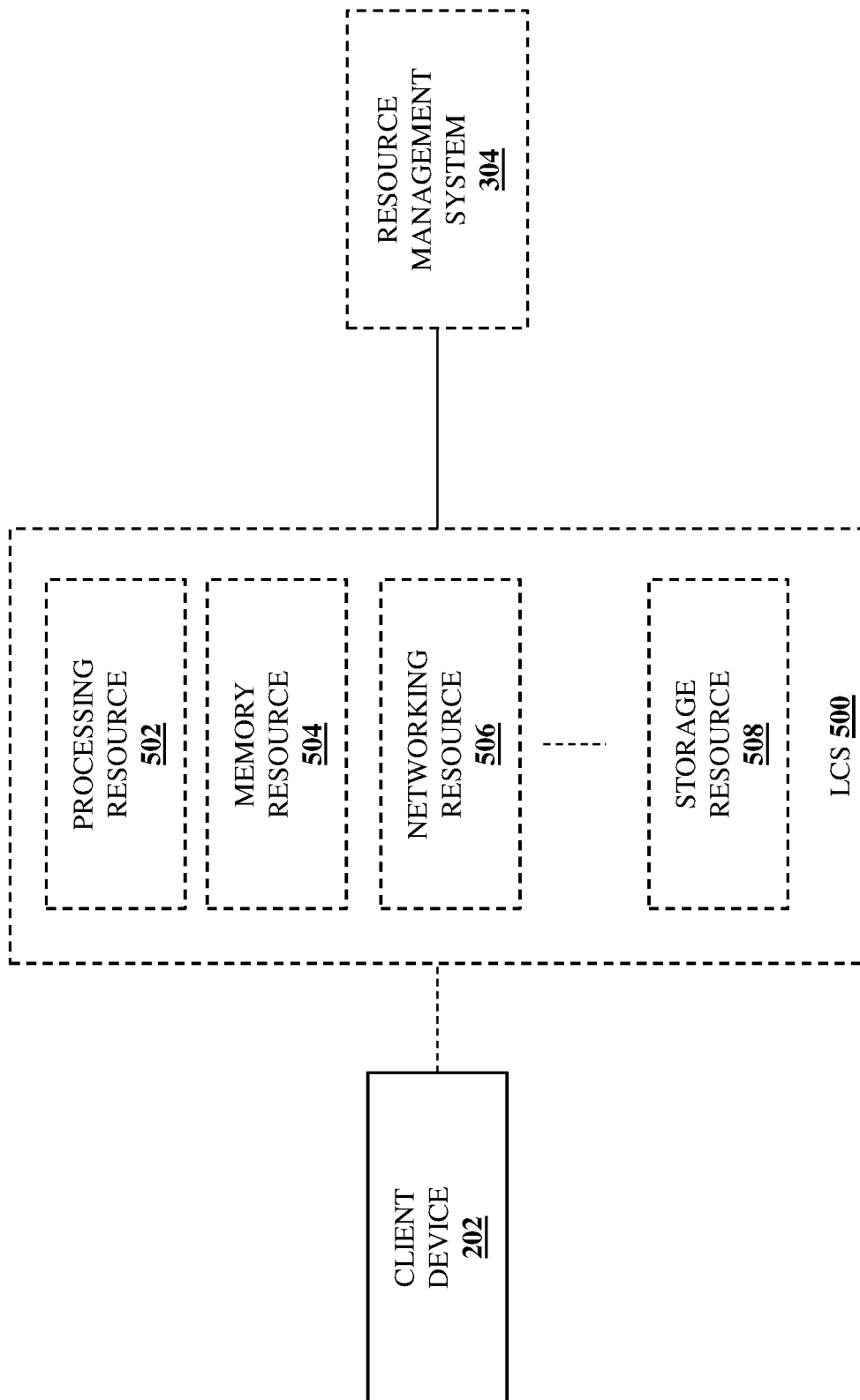
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s) (e.g., one or more cores from a CPU that provide 10 Ghz of processing power), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
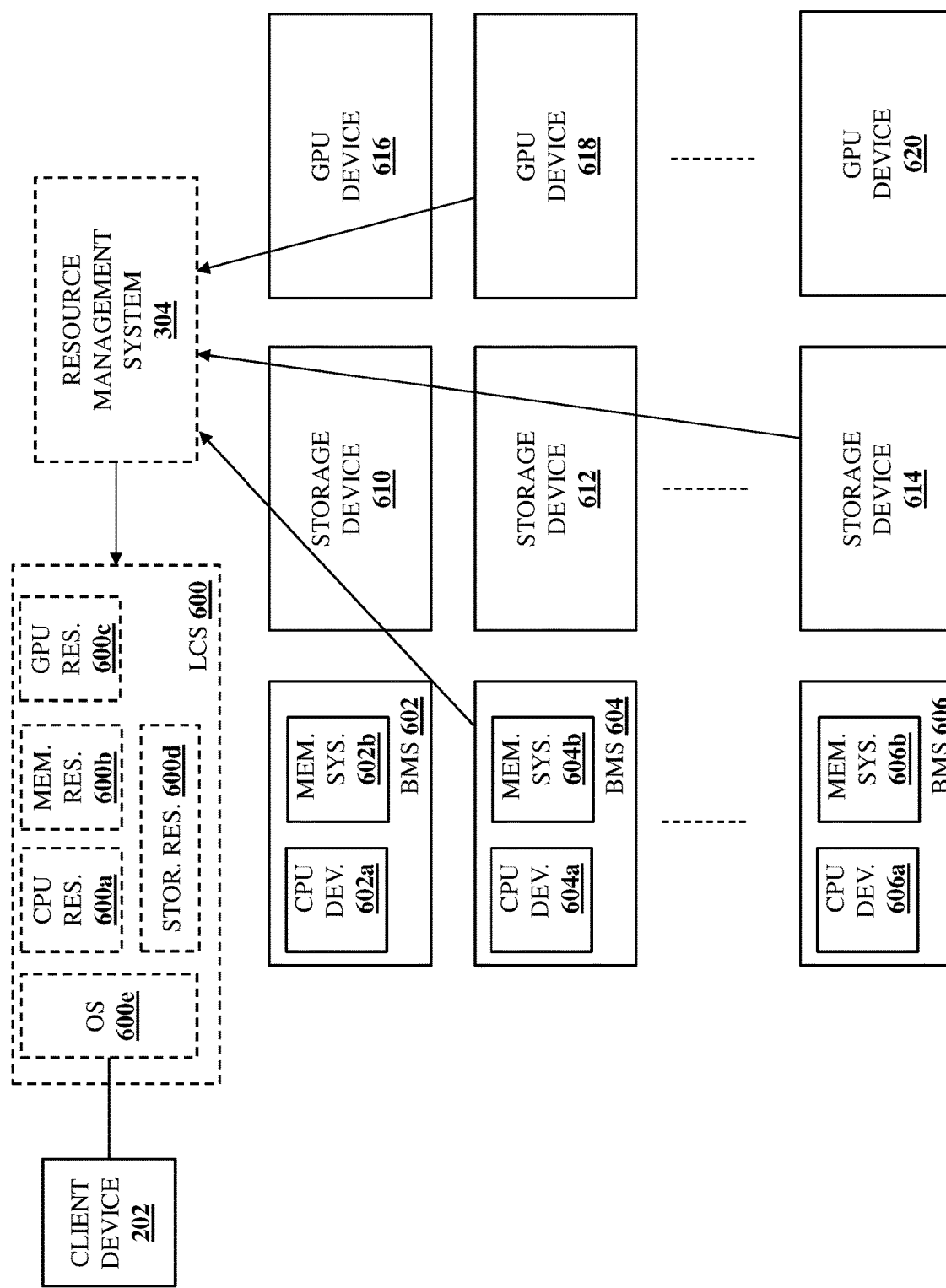
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
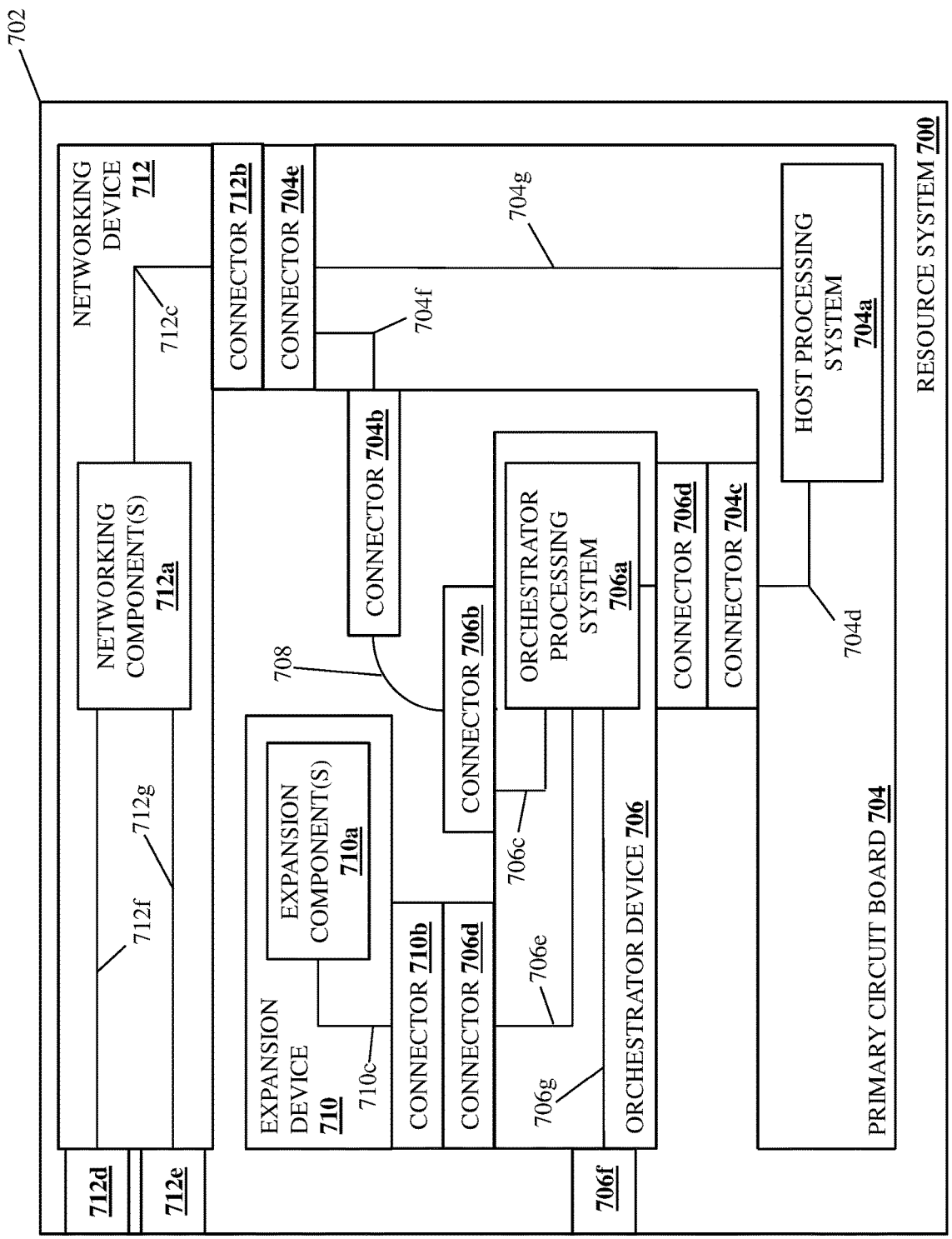
FIG. 7 is a schematic view illustrating an embodiment of the resource system of FIG. 4 including the LCS networking device multi-host primary circuit board system of the present disclosure.

Referring now to FIG. 7, an embodiment of a resource system 700 is illustrated that may provide the resource system 400 discussed above with reference to FIG. 4, and that is configured to provide the LCS networking device multi-host primary circuit board system of the present disclosure. As such, the resource system 700 may be provided by the IHS 100 discussed above with reference to FIG. 1 and/or may include some or all of the components of the IHS 100, and in specific examples may be provided by a BMS system as described above. Furthermore, while illustrated and discussed as being provided by a BMS system, one of skill in the art in possession of the present disclosure will recognize that the functionality of the resource system 700 discussed below may be provided by other devices that are configured to operate similarly as the resource system 700 discussed below. In the illustrated embodiment, the resource system 700 includes a chassis 702 that houses the components of the resource system 700, only some of which are illustrated and described below.

For example, the chassis 702 may house a primary circuit board 704 that includes a host processing system 704a that one of skill in the art in possession of the present disclosure will appreciate may be utilized as discussed above to provide an operating system for an LCS. In a specific example, the primary circuit board 704 may be provided by a motherboard, with the host processing system 704a provided by a x86 Central Processing Unit (CPU), although other circuit boards and host processing systems will fall within the scope of the present disclosure as well. In the illustrated embodiment, a "first orchestrator device" connector 704b is included on the primary circuit board 704, and in specific examples may be provided by a cable connector that is mounted to the primary circuit board 704, and that may be provided by a Mini Cool Edge Input/Output (MCIO) connector available from AMPHENOL® Corporation of Wallingford, Connecticut, United States, and/or other types of cable connectors that would be apparent to one of skill in the art in possession of the present disclosure.

In the illustrated embodiment, a "second orchestrator device" connector 704c is included on the primary circuit board 704, and in specific examples may be provided by a Peripheral Component Interconnect express (PCIe) connector that is mounted to the primary circuit board 704 and coupled via circuit board traces 704d in the primary circuit board 704 to the host processing system 704a. In the embodiments described below, the second orchestrator device connector 704c is a ×16 connector, although one of skill in the art in possession of the present disclosure will appreciate how "smaller" connectors (e.g., ×4, ×8, etc.) or "larger" connectors (e.g., ×32, ×64, etc.) may be implemented as the second orchestrator device connector 704c according to the teachings of the present disclosure while remaining within its scope.

In the illustrated embodiment, a "networking device" connector 704e is included on the primary circuit board 704, and in specific examples may be provided by a Peripheral Component Interconnect express (PCIe) connector that is mounted to the primary circuit board 704 and that is coupled via circuit board traces 704f in the primary circuit board 704 to the first orchestrator device connector 704b, and via circuit board traces 704g in the primary circuit board 704 to the host processing system 704a. In the embodiments described below, the networking device connector 704e may be a ×16 connector, with the circuit board traces 704f providing ×8 lanes from the networking device connector 704e to the first orchestrator device connector 704b, and the circuit board traces 704g providing ×8 lanes from the networking device connector 704e to the host processing system 704a, although one of skill in the art in possession of the present disclosure will appreciate how "smaller" connectors (e.g., ×4, ×8, etc.) or "larger" connectors (e.g., ×32, ×64, etc.) and corresponding circuit board trace routing may be implemented for the networking device connector 704e according to the teachings of the present disclosure while remaining within its scope.

In an embodiment, the chassis 702 may house an orchestrator device 706 that may provide any of the SCP devices (e.g., the SCP device 406 discussed above with reference to FIG. 4), DPU devices, and/or other orchestrator devices discussed herein that are configured to perform orchestration operations for an LCS. FIG. 7 illustrates the orchestrator device 706 including an orchestrator processing system 706a, but as discussed above the orchestrator device 706 may include any of a variety of hardware/components to provide any of a variety of orchestrator functionality that would be apparent to one of skill in the art in possession of the present disclosure. The orchestrator device 706 also includes a connector 706b that is configured to connect to the first orchestrator device connector 704b on the primary circuit board 704. In specific examples, the connector 706b on the orchestrator device 706 may be provided by a cable connector that is mounted to a circuit board included on the orchestrator device 706, and that may be provided by a Mini Cool Edge Input/Output (MCIO) connector available from AMPHENOL® Corporation of Wallingford, Connecticut, United States, and/or other types of cable connectors that would be apparent to one of skill in the art in possession of the present disclosure, with the connector 706b coupled via circuit board traces 706c in the circuit board in the orchestrator device 706 to the orchestrator processing system 706a. As illustrated, a cable 708 may be used to couple the first orchestrator device connector 704b to the connector 706b, and may be provided by a Micro Twin-ax coaxial cable terminated with the MCIO connectors discussed above, and/or other types of cables that would be apparent to one of skill in the art in possession of the present disclosure.

The orchestrator device 706 also includes an expansion connector 706d that is configured to connect to the expansion device 710 discussed below, and in specific examples may be provided by a PCIe connector that extends from the circuit board in the orchestrator device 706, with the expansion connector 706d coupled to the orchestrator processing system 706a via circuit board traces 706e in the circuit board in the orchestrator device 706. In the embodiments described below, the expansion connector 706d is a ×8 connector, although one of skill in the art in possession of the present disclosure will appreciate how "smaller" connectors (e.g., ×4) or "larger" connectors (e.g., ×16, ×32, etc.) may be implemented as the expansion connector 706d according to the teachings of the present disclosure while remaining within its scope. The orchestrator device 706 also includes a networking connector 706f, which in the specific examples may be provided by an Ethernet connector that is mounted to the circuit board in the orchestrator device 706, with the networking connector 706f coupled to the orchestrator processing system 706a via circuit board traces 706g in the circuit board in the orchestrator device 706, and configured to couple to networked devices via, for example, an Ethernet cable.

In an embodiment, the chassis 702 may house an expansion device 710 that may be configured to perform at least one function for an LCS, which may include function(s) that are not available from the orchestrator device 708 in some examples, and may include function(s) that are available from the orchestrator device 708 but offloaded from the orchestrator device 708 by the expansion device 710 in other examples. FIG. 7 illustrates the expansion device 710 including one or more expansion components 710a that one of skill in the art in possession of the present disclosure will appreciate may be configured to perform the function(s) discussed above. In specific examples, the expansion component(s) 710a in the expansion device 710 may include Field Programmable Gate Array (FPGA) devices, networking devices, storage controllers (e.g., NEVOX® Non-Volatile Memory express (NVMe) storage controllers available from MARVEL® Semiconductor Inc. of Santa Clara, California, United States), and/or other components that would be apparent to one of skill in the art in possession of the present disclosure. However, while specific expansion component(s) 710a have been described, one of skill in the art in possession of the present disclosure will appreciate how the expansion device 710 may include any of a variety of hardware/components to provide any of a variety of expansion functionality while remaining within the scope of the present disclosure as well. In the example illustrated in FIG. 7, the expansion device 710 also includes a connector 710b that is configured to connect to the expansion connector 706d on the orchestrator device 706. In specific examples, the connector 710b may be provided by a PCIe connector that extends from a circuit board in the expansion device 710, with the connector 710b coupled via circuit board traces 710c in the circuit board in the expansion device 710 to the expansion component(s) 710a. However, one of skill in the art in possession of the present disclosure will appreciate how the expansion device 710 may be cabled to the orchestrator device 706 while remaining within the scope of the present disclosure as well.

While the expansion device 710 is illustrated as connected to only the orchestrator device 706, one of skill in the art in possession of the present disclosure will appreciate how the expansion device 710 may be connected to the primary circuit board 704 in other, non-illustrated embodiments. For example, while not illustrated in FIG. 7, the expansion device 710 may also include a connector (e.g., similar to the connector 710b) that is configured to connect to a connector on the primary circuit board 704 (e.g., similar to the connector 704c). As will be appreciated by one of skill in the art in possession of the present disclosure, such a configuration may allow the expansion device 710 to perform multi-host functionality similar to that described below for the networking device 712 in order to, for example, further offload functionality from the orchestrator device 708 via communications directly with the host processing system 704a.

In an embodiment, the chassis 702 may also house networking device 712 that may be configured to perform networking operations for an LCS. For example, the networking device 712 may be provide by a Network Interface Controller (NIC) device (e.g., the OCP NIC 3.0 networking device discussed above), although other networking devices will fall within the scope of the present disclosure as well. FIG. 7 illustrates the networking device 712 including one or more networking components 712a, but one of skill in the art in possession of the present disclosure will appreciate how the networking device 712 may include any of a variety of hardware/components to provide any of a variety of networking functionality that would be apparent to one of skill in the art in possession of the present disclosure. As discussed above, the networking device 712 may be provided in the resource system 700 in order to provide additional networking bandwidth (e.g., in addition to that available from the orchestrator device 706), to provide functionality not available in the orchestrator device 712 (e.g., RDMA functionality), to provide a data path (e.g., to the host processing system 704a) that bypasses the orchestrator device 712 (e.g., that bypasses a data path provided by the networking connector 706f on the orchestrator device 706), and/or for other reasons that would be apparent to one of skill in the art in possession of the present disclosure.

The networking device 712 also includes a connector 712b that is configured to connect to the networking device connector 704e on the primary circuit board 704. In specific examples, the connector 712b on the networking device 712 may be provided by a PCIe connector that extends from a circuit board in the networking device 712, with the connector 712b coupled via circuit board traces 712c in the circuit board in the networking device 712 to the networking component(s) 712a. The networking device 712 also includes networking connectors 712d and 712e, which in specific examples may be provided by Ethernet connectors that are mounted to the circuit board in the networking device 712, with the networking connector 712d coupled to the networking component(s) 712a via circuit board traces 712f in the circuit board on the networking device 712, the networking connector 712e coupled to the networking component(s) 712a via circuit board traces 712g in the circuit board pm the networking device 712, and with each networking connector 712d and 712e configured to couple to networked devices via, for example, a respective Ethernet cable. As discussed above and in further detail below, in some embodiments the networking connectors 712d and 712e may enable data path(s) (e.g., to the host processing system 704a) that bypass the orchestrator device 706.

As discussed above, it may be desirable to provide the networking device 712 as an additional networking device in the resource system 700 for an LCS (i.e., in addition to the orchestrator device 706 that one of skill in the art in possession of the present disclosure will appreciated may perform networking functionality as well). However, one of skill in the art in possession of the present disclosure will appreciate that the resource system 700 for the LCS include two hosts: a first host provided by the host processing system 704a included on the primary circuit board 704 of the resource system 700, and a second host provided by an orchestrator processing system 706a included on the orchestrator device 706, and conventional resource systems only allow such networking devices to couple to its primary circuit board/motherboard using a connector that is hardwired (e.g., via circuit board/motherboard traces) to the host processing system, thus preventing the networking device from being directly connected to its orchestrator device. As such, while networking devices such as OCP NIC 3.0 networking devices may be capable of utilizing multiple hosts, the inability to connect them to each of those multiple hosts in conventional resource systems prevents the provisioning of their functionality to both the first host/host processing system and the second host/orchestrator processing system in conventional resources systems.

Embodiments of the resource system 700 of the present disclosure solves such issues by providing ×8 lanes from the ×16 networking device connector 704e via the circuit board traces 704g to the host processing system 704a on the primary circuit board 704, and providing ×8 lanes from the x16 networking device connector 704e via the circuit board traces 704f to the first orchestrator device connector 704b on the primary circuit board 704 (e.g., a "porpoised" cable connector on the motherboard with motherboard trace connectivity to the networking device connector 704c and cable connectivity to the orchestrator device 706), which as discussed herein allows the orchestrator device 706 to be cabled to the first orchestrator device connector 704b, thus providing the networking device 712 a data path to each of the host processing system 704a and the orchestrator processing system 706a. As such, the multi-host networking device 712 may utilize its connection to the networking device connector 704e to access either or both of the host processing system 704a and the orchestrator processing system 706a/orchestrator device 706. However, while a specific resource system 700 providing the LCS networking device multi-host primary circuit board system of the present disclosure has been illustrated and described, one of skill in the art in possession of the present disclosure will recognize that the LCS networking device multi-host primary circuit board system of the present disclosure may include a variety of components and/or component configurations for providing the benefits described herein while remaining within the scope of the present disclosure as well.

Figure 8:
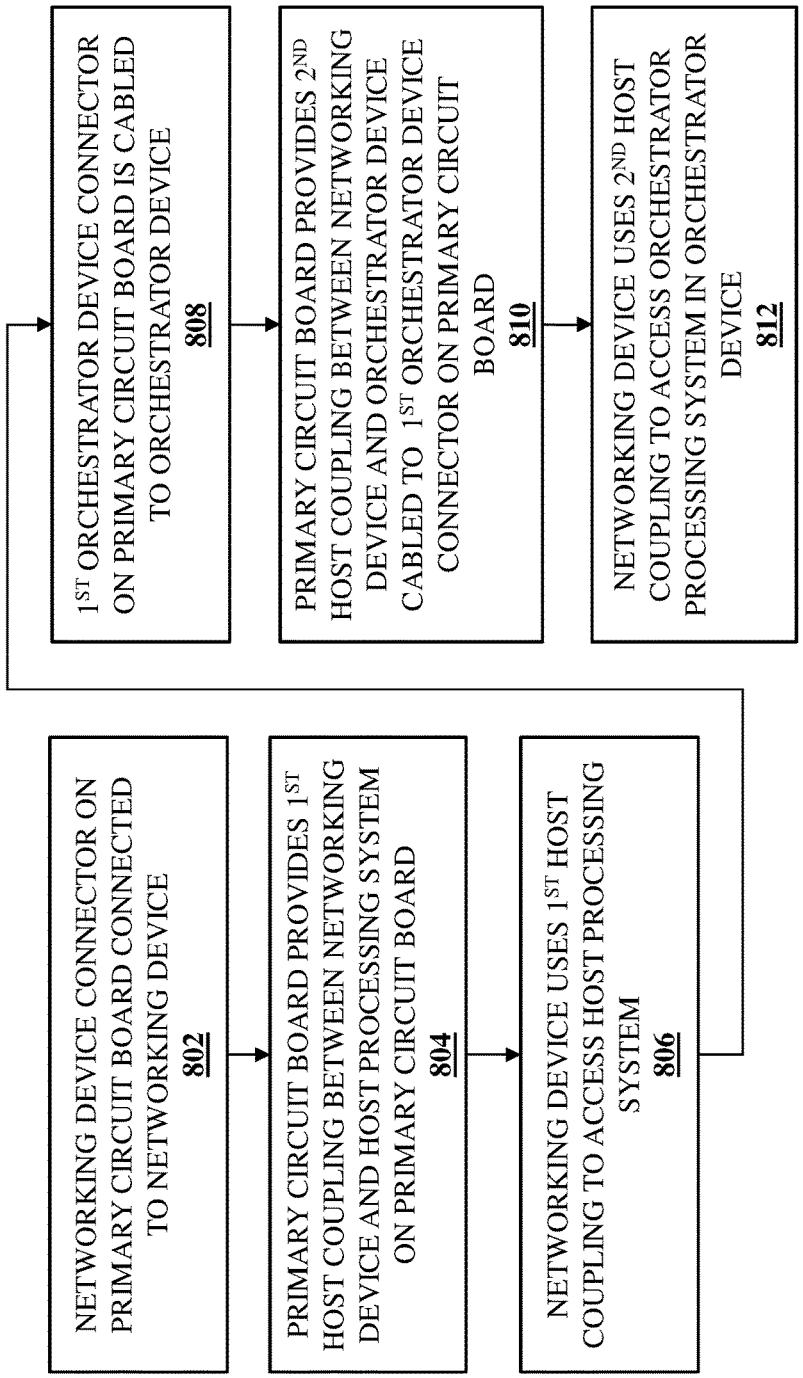
FIG. 8 is a flow chart illustrating an embodiment of a method for coupling an LCS networking device to multiple hosts in an LCS via a primary circuit board.

Referring now to FIG. 8, an embodiment of a method 800 coupling a Logically Composed System (LCS) networking device to multiple hosts in an LCS via a primary circuit board is illustrated. As discussed below, the systems and methods of the present disclosure enable multi-host functionality for a networking device in a resource system providing an LCS. For example, the LCS networking device multi-host primary circuit board system of the present disclosure may include a primary circuit board having a host processing system that provides an operating system for an LCS. A networking device connector on the circuit board is configured to connect to a networking device that performs networking operation(s) for the LCS, with the networking device connector also coupled via the circuit board to the host processing system to provide a first host coupling that is used by the networking device to access the host processing system. A first orchestrator device connector on the circuit board is configured to cable to an orchestrator device including an orchestrator processing system that performs orchestration operations for the LCS, with the first orchestrator device connector also coupled via the circuit board to the networking device connector to provide a second host coupling that is used by the networking device to access the orchestrator processing system. Thus, the networking device may separately access both a host processing system that provides an operating system for the LCS, and an orchestrator processing system that performs orchestrator operations for the LCS.

The method 800 begins at block 802 where a networking device connector on a primary circuit board is connected to a networking device. With reference to FIG. 7, in an embodiment of block 802, the networking device 712 may be connected to the primary circuit board 704 by positioning the networking device 712 adjacent the primary circuit board 704 with the connector 712b on the networking device 712 aligned with the networking device connector 704e on the primary circuit board 704, and moving the networking device 712 towards the primary circuit board 704 such that the connector 712b on the networking device 712 engages with the networking device connector 704e on the primary circuit board 704. In a specific example, an NIC device provided by the networking device 712 may be connected to a motherboard provided by the primary circuit board 704 via PCIe connection of the NIC device to the motherboard.

Figure 9:
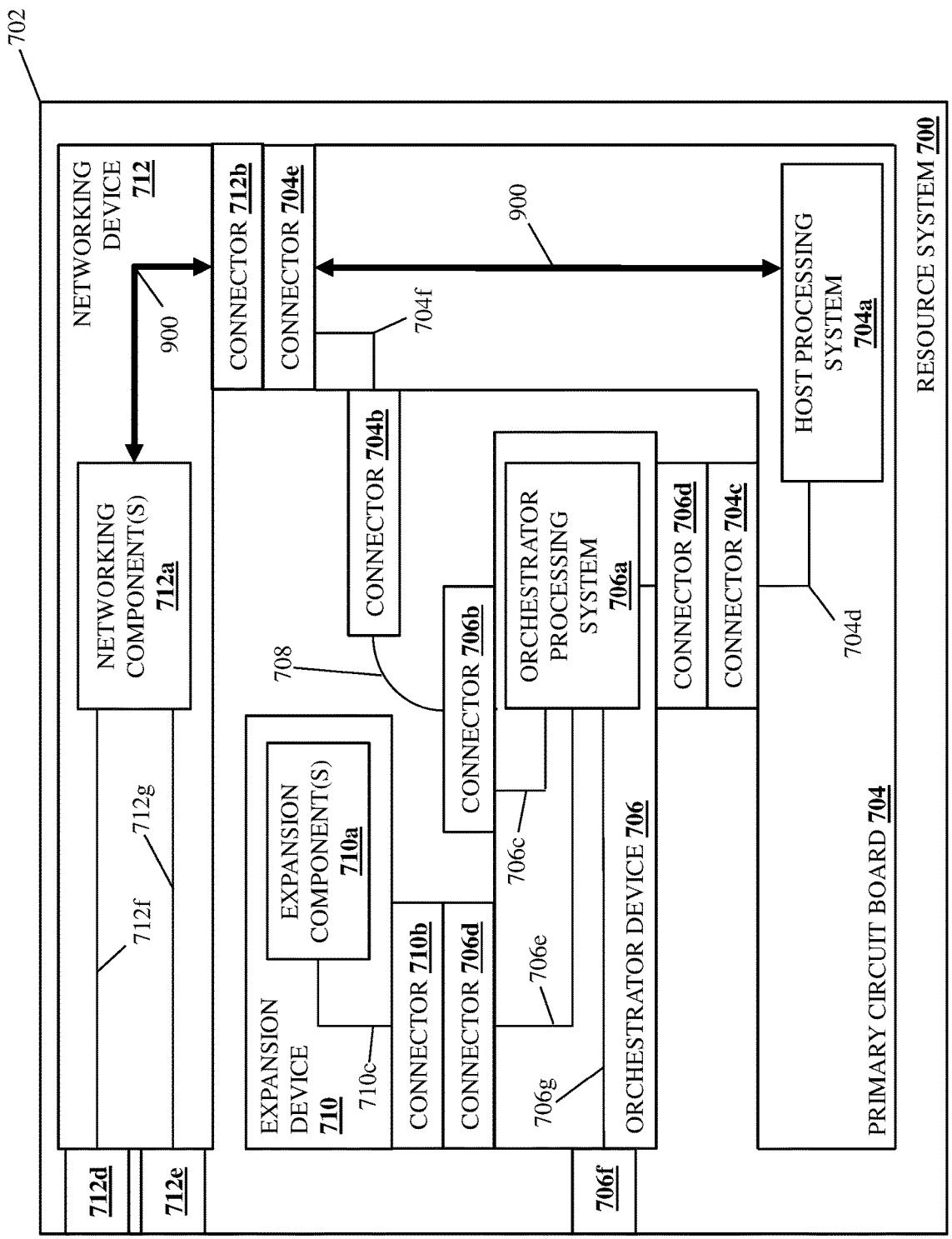
FIG. 9 is a schematic view illustrating an embodiment of the resource system of FIG. 7 operating during the method of FIG. 8.

The method 800 then proceeds to block 804 where the primary circuit board provides a first host coupling between the networking device and a host processing system on the primary circuit board. With reference to FIG. 9, in an embodiment of block 804, the primary circuit board 704 provides a first host coupling 900 via its connection to the networking device 712 discussed above. For example, FIG. 9 illustrates how the first host coupling 900 may be provided by the circuit board traces 704g in the primary circuit board 704 between the host processing system 704a and the networking device connector 704e, the connection of the networking device connector 704e on the primary circuit board 704 and the connector 712b on the networking device 712, and the circuit board traces 712c in the circuit board on the networking device 712 between the connecter 712b and the networking component(s) 712a. Continuing with the specific example above, the motherboard provided by the primary circuit board 704 provides the first host coupling 900 between the NIC device provided by the networking device 712 and the x86 processor provided by the host processing system 704a via PCIe connection of the NIC device to the motherboard.

The method 800 then proceeds to block 806 where the networking device uses the first host coupling to access the host processing system. With continued reference to FIG. 9, in an embodiment of block 806, the networking component(s) 712a in the networking device 712 may utilize the first host coupling 900 to access the host processing system 704a on the primary circuit board 704. In a specific example, at block 806 the networking component(s) 712a in the networking device 712 may utilize the first host coupling 900 to provide additional networking bandwidth for the operating system provided by the host processing system 704a for the LCS, perform functionality for the host processing system 704a that the orchestrator device 706 is not configured to perform (e.g., Remote Direct Memory Access (RDMA) functionality), provide a data path to the host processing system 704a that bypasses the orchestrator device 706, and/or perform other networking/host processing system functionality that would be apparent to one of skill in the art in possession of the present disclosure. However, while specific uses of the first host coupling 900 have been described, one of skill in the art in possession of the present disclosure will appreciate that the networking component(s) 712a in the networking device 712 may utilize the first host coupling 900 in a variety of manners that will fall within the scope of the present disclosure as well.

The method 800 then proceeds to block 808 where a first orchestrator device connector on the primary circuit board is cabled to an orchestrator device. With reference to FIG. 7, in an embodiment of block 808, the orchestrator device 706 may be connected to the primary circuit board 704 by connecting the cable 708 to each of the first orchestrator device connector 704b on the primary circuit board 704, and the connector 706b on the orchestrator device 706. In a specific example, an SCP device or DPU device provided by the orchestrator device 706 may be cabled to a motherboard provided by the primary circuit board 704 via the cable 708 connected to each of the connector 704b on the SCP device or DPU device and the first orchestrator device connector 704b on the motherboard.

In the embodiment illustrated in FIG. 7, the orchestrator device 706 includes a second connection to the primary circuit board 704, and the expansion device 710 is connected to the orchestrator device 706, although one of skill in the art in possession of the present disclosure will recognize that the second connection of the orchestrator device 706 and the primary circuit board 704 may be omitted, and/or the connection of the expansion device 710 to the orchestrator device 706 may be omitted, while remaining within the scope of the present disclosure as well. As such, in embodiments of block 808 that include the second connection of the orchestrator device 706 to the primary circuit board 704, the orchestrator device 706 may be provided with a second connection to the primary circuit board 704 by positioning the orchestrator device 706 adjacent the primary circuit board 704 with the connector 706d on the orchestrator device 706 aligned with the second orchestrator device connector 704c on the primary circuit board 704, and moving the orchestrator device 706 towards the primary circuit board 704 such that the connector 706d on the orchestrator device 706 engages with the second orchestrator device connector 704c on the primary circuit board 704. In a specific example, the SCP device or DPU device provided by the orchestrator device 712 may be connected to a motherboard provided by the primary circuit board 704 via PCIe connectors provided by the connector 706d on the SCP device or DPU device and the second orchestrator device connector 704c on the motherboard.

Similarly, in embodiments of block 808 that include the connection of the expansion device 710 to the orchestrator device 706, the expansion device 710 may be connected to the orchestrator device 706 by positioning the expansion device 710 adjacent the orchestrator device 706 with the connector 710b on the expansion device 710 aligned with the connector 706d on the orchestrator device 706, and moving the expansion device 710 towards the orchestrator device 706 such that the connector 710b on the expansion device 710 engages with the connector 706d on the orchestrator device 706. In a specific example, the expansion device 710 may be connected to the SCP device or DPU device provided by the orchestrator device 706 via PCIe connectors provided by the connector 710b on the expansion device 710 and the connector 706d on the SCP device or DPU device.

Figure 10:
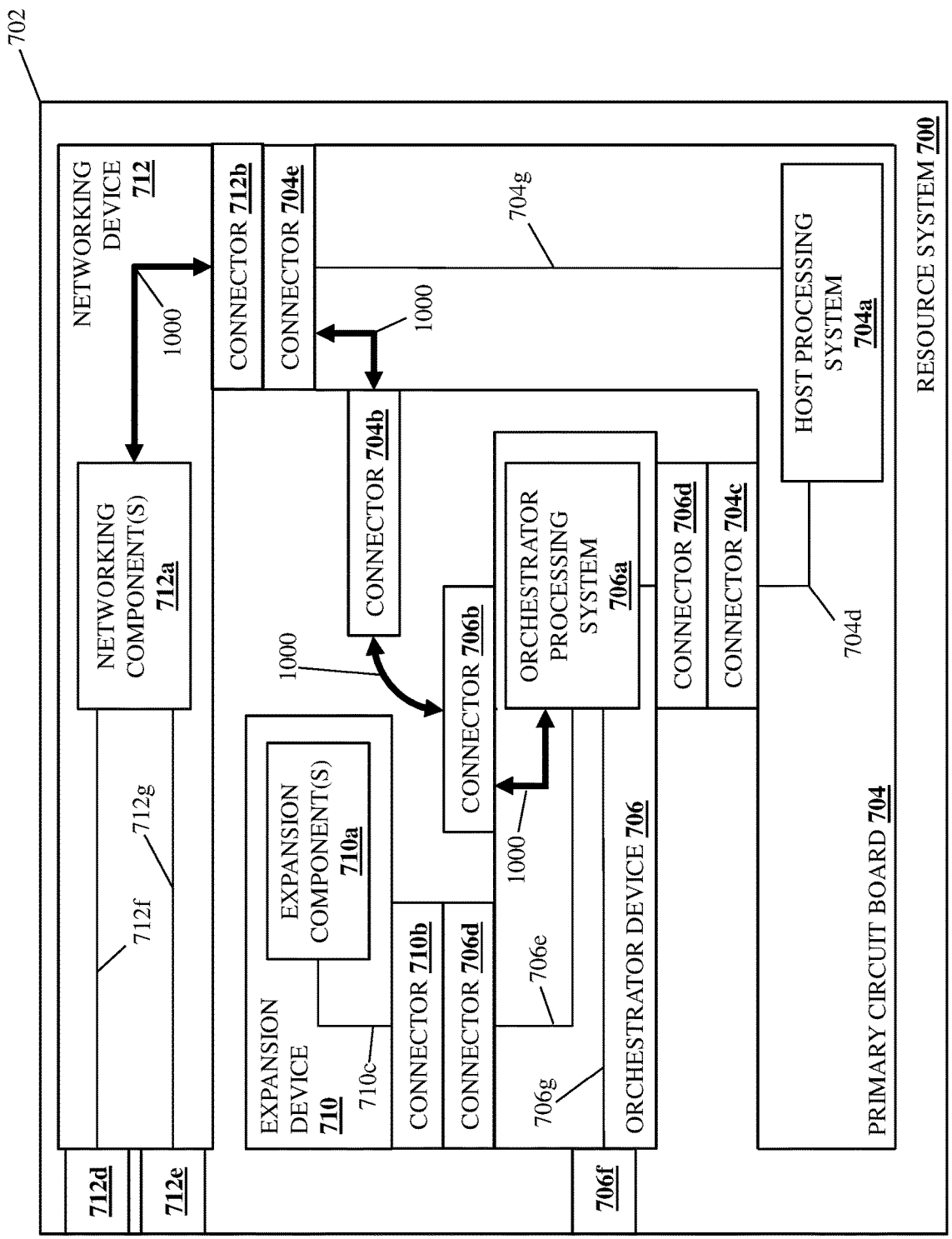
FIG. 10 is a schematic view illustrating an embodiment of the resource system of FIG. 7 operating during the method of FIG. 8.

The method 800 then proceeds to block 810 where the primary circuit board provides a second host coupling between the networking device and the orchestrator device cabled to the first orchestrator device connector on the primary circuit board. With reference to FIG. 10, in an embodiment of block 810, the primary circuit board 704 provides a second host coupling 1000 via its connection to the networking device 712 and the orchestrator device 706 discussed above. For example, FIG. 10 illustrates how the second host coupling 1000 may be provided by the circuit board traces 706c in the circuit board on the orchestrator device 706 between the orchestrator processing system 706a and the connector 706b, the connection of cable 708 between the connector 706b on the orchestrator device 706b and the first orchestrator device connector 704b on the primary circuit board 704, the circuit board traces 704f in the primary circuit board 704 between on the first orchestrator device connecter 704b and the networking device connector 704e, the connection of the networking device connector 704e on the primary circuit board 704 and the connector 712b on the networking device 712, and the circuit board traces 712c in the circuit board on the networking device 712 between on the networking device connecter 712b and the networking component(s) 712a. Continuing with the specific example above, the motherboard provided by the primary circuit board 704 provides the second host coupling 1000 between the NIC device provided by the networking device 712 and the SCP processor or DPU processor provided by the orchestrator processing system 706a via a PCIe connection of the NIC device to the motherboard, and a cabled connection of the SCP device or DPU device to the motherboard.

The method 800 then proceeds to block 812 where the networking device uses the second host coupling to access an orchestrator processing system in the orchestrator device. With continued reference to FIG. 10, in an embodiment of block 812, the networking component(s) 712a in the networking device 712 may utilize the second host coupling 1000 to access the orchestrator processing system 706a on the orchestrator device 706. In a specific example, at block 812 the networking component(s) 712a in the networking device 712 may utilize the second host coupling 1000 to provide additional networking bandwidth for the orchestrator engine provided by the orchestrator processing system 706a performing orchestration operations for the LCS, perform functionality for the orchestrator processing system 706a that the orchestrator device 706 is not configured to perform (e.g., Remote Direct Memory Access (RDMA) functionality), to direct data communications to the orchestrator device 706 in order to allow the orchestrator processing system 706a to perform any of a variety of services on data in those data communications, and/or perform other networking/orchestrator processing system functionality that would be apparent to one of skill in the art in possession of the present disclosure. However, while specific uses of the second host coupling 1000 have been described, one of skill in the art in possession of the present disclosure will appreciate that the networking component(s) 712a in the networking device 712 may utilize the second host coupling 1000 in a variety of manners that will fall within the scope of the present disclosure as well.

Thus, systems and methods have been described that enable multi-host functionality for a NIC device in a BMS system providing an LCS. For example, the LCS NIC device multi-host motherboard system of the present disclosure may include a motherboard having a x86 CPU that provides an operating system for an LCS. A NIC device connector on the motherboard is configured to connect to a NIC device that performs networking operation(s) for the LCS, with the NIC device connector also coupled via the motherboard to the x86 CPU to provide a first host coupling that is used by the NIC device to access the x86 CPU. A first SCP device connector on the motherboard is configured to cable to an SCP device including an SCP processor that performs orchestration operations for the LCS, with the first SCP device connector also coupled via the motherboard to the NIC device connector to provide a second host coupling that is used by the NIC device to access the SCP processor. Thus, the NIC device may separately access both a x86 CPU that provides an operating system for the LCS, and an SCP processor that performs orchestrator operations for the LCS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) networking device multi-host primary circuit board system, comprising:
   a primary circuit board including a host processing system that provides an operating system for a Logically Composed System (LCS);
   a networking device connector that is included on the primary circuit board and that is configured to connect to a networking device that performs at least one networking operation for the LCS, wherein the networking device connector is also coupled via the primary circuit board to the host processing system to provide a first host coupling that is configured for use by the networking device to access the host processing system; and
   a first orchestrator device connector that is included on the primary circuit board and that is configured to cable to an orchestrator device that includes an orchestrator processing system that performs orchestration operations for the LCS, wherein the first orchestrator device connector is also coupled via the primary circuit board to the networking device connector to provide a second host coupling that is configured for use by the networking device to access the orchestrator processing system.

2. The system of claim 1, wherein the primary circuit board is a motherboard.

3. The system of claim 2, wherein ×8 lanes of the ×16 connectors are coupled via primary circuit board traces in the primary circuit board to the host processing system.

4. The system of claim 1, wherein the networking device connector is a ×16 connector, and wherein the orchestrator device connector is a ×8 connector.

5. The system of claim 1, wherein the networking device is provided according to the Open Compute Project (OCP) NIC 3.0 specification.

6. The system of claim 1, further comprising:
a second orchestrator device connector that is included on the primary circuit board and that is configured to connect to the orchestrator device, wherein the second orchestrator device connector is also coupled via the primary circuit board to the host processing system to provide a host/host coupling between the host processing system and the orchestrator processing system.

7. An Information Handling System (IHS), comprising:
a networking device that performs at least one networking operation for a Logically Composed System (LCS);
an orchestrator device including an orchestrator processing system that performs orchestration operations for the LCS;
a primary circuit board including a host processing system that provides an operating system for the LCS, wherein the primary circuit board includes:
a networking device connector that is configured to connect to the networking device and that is also coupled via the primary circuit board to the host processing system to provide a first host coupling that is configured for use by the networking device to access the host processing system; and
a first orchestrator device connector that is configured to cable to the orchestrator device and that is also coupled via the primary circuit board to the networking device connector to provide a second host coupling that is configured for use by the networking device to access the orchestrator processing system.

8. The IHS of claim 7, wherein the primary circuit board is a motherboard.

9. The IHS of claim 7, wherein the networking device connector is a ×16 connector, and wherein the orchestrator device connector is a ×8 connector.

10. The IHS of claim 9, wherein ×8 lanes of the ×16 connectors are coupled via primary circuit board traces in the primary circuit board to the host processing system.

11. The IHS of claim 7, wherein the networking device is provided according to the Open Compute Project (OCP) NIC 3.0 specification.

12. The IHS of claim 7, wherein the primary circuit board includes:
a second orchestrator device connector that is configured to connect to the orchestrator device, wherein the second orchestrator device connector is also coupled via the primary circuit board to the host processing system to provide a host/host coupling between the host processing system and the orchestrator processing system.

13. The IHS of claim 7, wherein the at least one networking operation performed by the networking device includes Remote Direct Memory Access (RDMA) operations that are not available from the orchestrator device.

14. A method for coupling a Logically Composed System (LCS) networking device to multiple hosts in an LCS via a primary circuit board, comprising:
connecting, by a networking device connector on a primary circuit board that includes a host processing system that provides an operating system for a Logically Composed System (LCS), to a networking device that performs at least one networking operation for a Logically Composed System (LCS);
providing, via the primary circuit board that couples the networking device connector to the host processing system, a first host coupling that is used by the networking device to access the host processing system;
cabling, by a first orchestrator device connector on the primary circuit board, to an orchestrator device including an orchestrator processing system that performs orchestration operations for the LCS; and
providing, via the primary circuit board that couples the first orchestrator device connector to the networking device connector, a second host coupling that is used by the networking device to access the orchestrator processing system.

15. The method of claim 14, wherein the primary circuit board is a motherboard.

16. The method of claim 14, wherein the networking device connector is a ×16 connector, and wherein the orchestrator device connector is a ×8 connector.

17. The method of claim 16, wherein ×8 lanes of the ×16 connectors are coupled via primary circuit board traces in the primary circuit board to the host processing system.

18. The method of claim 14, wherein the networking device is provided according to the Open Compute Project (OCP) NIC 3.0 specification.

19. The method of claim 14, further comprising:
connecting, by a second orchestrator device connector on the primary circuit board, to the orchestrator device; and
providing, via the primary circuit board that couples the second orchestrator device connector to the host processing system, a host/host coupling between the host processing system and the orchestrator processing system.

20. The method of claim 14, wherein the at least one networking operation performed by the networking device includes Remote Direct Memory Access (RDMA) operations that are not available from the orchestrator device.

* * * * *